United States Patent [19]
Heggelund

[11] Patent Number: 5,156,111
[45] Date of Patent: Oct. 20, 1992

[54] METHODS AND APPARATUS FOR TRANSPORTING, INCUBATING, AND GROWING OUT THE EGGS OF AQUATIC CREATURES

[75] Inventor: Per O. Heggelund, Seattle, Wash.

[73] Assignee: 501 Aquaseed Corporation, Seattle, Wash.

[21] Appl. No.: 639,035

[22] Filed: Jan. 8, 1991

[51] Int. Cl.⁵ .............................................. A01K 61/00
[52] U.S. Cl. ......................................................... 119/3
[58] Field of Search ............................. 119/2, 3, 4, 5

[56] References Cited

U.S. PATENT DOCUMENTS

| | | | |
|---|---|---|---|
| 2,207,514 | 7/1940 | Haldeman | 119/5 |
| 2,302,336 | 11/1942 | MacDonald | 119/3 X |
| 2,328,993 | 9/1943 | Norling | 119/3 X |
| 2,680,424 | 6/1954 | Brown | 119/3 |
| 3,192,899 | 7/1965 | Lucey et al. | 119/2 |
| 3,236,206 | 2/1966 | Willinger | 119/5 |
| 3,735,737 | 5/1973 | Budge | 119/4 |
| 4,007,709 | 2/1977 | Wishner | 119/2 |
| 4,089,298 | 5/1978 | Wilson | 119/4 X |
| 4,180,012 | 12/1979 | Zenger, Sr. | 119/3 |
| 4,182,269 | 1/1980 | Young, II | 119/3 |
| 4,214,551 | 7/1980 | McNeil et al. | 119/3 |
| 4,300,477 | 11/1981 | Chapman | 119/2 |
| 4,559,902 | 12/1985 | Mason et al. | 119/2 |
| 4,998,505 | 3/1991 | Jordan | 119/3 |

Primary Examiner—Gene Mancene
Assistant Examiner—Thomas Price
Attorney, Agent, or Firm—Hughes & Multer

[57] ABSTRACT

Methods and apparatus for transporting, incubating, and growing out the eggs of aquatic creatures. The apparatus includes an insulated container and a spacing structure which rests on the bottom wall of the container. One or more egg containers are placed on the spacing structure to keep water in the insulated container from drowning the eggs, and the container is iced. An inlet port is so located that water can be introduced into the box below the egg containers. The egg containers may be open trays or closed tubes. The apparatus may also include a pump, a filter, a cooler, and an aerater for recirculating water contained in the box during the transportation of fry.

13 Claims, 5 Drawing Sheets

METHODS AND APPARATUS FOR TRANSPORTING, INCUBATING, AND GROWING OUT THE EGGS OF AQUATIC CREATURES

TECHNICAL FIELD OF THE INVENTION

The present invention relates to novel improved devices which can be used to transport the eggs of aquatic creatures and then incubate and grow out the eggs.

One important application of the present invention is in salmonid rearing. The principles of the present invention will, in large part, be developed herein with reference to that application for the sake of brevity and clarity. In that respect, generic terms will be used when possible. Where no generic term exists, the term salmonids will be used with the understanding that the equivalent term for other aquatic creatures is meant to be included. It is to be understood, therefore, that this discussion of salmon farming is not intended to limit the scope of the invention as defined by the appended claims.

BACKGROUND OF THE INVENTION

Salmon farming begins in freshwater. Farmers strip ready-to spawn broodstock salmon of eggs and sperm. Prior to fertilization, the eggs are referred to as "green eggs". Once fertilized, the eggs are stored in trays, boxes or baskets fitted with mesh and are constantly flushed with water as they develop. The advanced fertilized eggs when developed to the point where the eyes of the embryo are apparent are referred to as "eyed eggs". The time from fertilization to hatching takes roughly 40 days, at 10° C. although the process varies with each species and is particularly sensitive to water temperature. When the eggs hatch, the resulting fry are referred to as alevin or sac fry. In this stage, the sac fry are still attached to, and obtain nourishment from, the yolk sac. The sac fry tend to hug the bottom of the container in which they are kept.

After the nutrients in the yolk sac are depleted, the fry swim to the surface and begin feeding. At this point, the fry are referred to as "starter fed" or "swim up" fry. When the fry, or fingerlings, reach the feeding stage, they are moved to troughs, or tanks.

Rearing fry to the next, smolt stage, at which time the fish are capable of adapting to a marine environment, takes from zero to 15 months depending on the species. Smoltification changes a fish's body shape and physical coloration. Once salmon reach this stage, the two-to-three-ounce fish are released into the ocean or transported to saltwater netpens anchored close to shore to begin the grow-out phase.

During the grow-out phase, the salmon are given a commercial diet for from nine months (for coho) to two years (for Atlantic salmon). The fish are typically fed 2 percent of their body weight per day; between one and a half and two pounds of feed produce one pound of salmon. It is common for fertilized fish eggs to be harvested at one location, transported to a second location, and hatched at that location.

At the eyed stage the salmonid embryo can be transported over long distances. During transportation and incubation, nevertheless the eggs of most aquatic creatures must be kept within a given temperature range. For example, the eyed eggs of salmonids should be kept between 35° and 45° Fahrenheit while the eggs are being transported. Heretofore, separate pieces of equipment have been employed to transport and incubate the fertilized eggs and then grow out the fry. One heretofore proposed transport device is disclosed in U.S. Pat. No. 3,194,211 issued Jul. 13, 1965 to Stanek for TRANSPORT AND COOLING CONTAINER FOR LIVING FISH ROE AND/OR FRY; and other transport containers are discussed in that patent. U.S. Pat. No. 3,024,764 issued Mar. 13, 1962 to Brittain et al for FISH EGGS INCUBATORS; U.S. Pat. No. 4,014,293 issued Mar. 29, 1977 to Salter for FISH EGG INCUBATOR; U.S. Pat. No. 4,094,270 issued Jun. 13, 1978 to WHITLOCK for FISH EGG INCUBATORS; U.S. Pat. No. 4,180,012 issued Dec. 25, 1979 to Zenger, Sr. for FISH EGG INCUBATOR WITH FRY RELEASE MEANS; and U.S. Pat. No. 4,182,269 issued Jan. 8, 1980 to Young, II for INCUBATOR FOR SALMON ID EGGS AND ALEVIN disclose heretofore proposed incubators.

Also, it is often desirable to plant fish in spawning streams to supplement natural spawning runs. Currently, in planting fish in spawning streams, eggs are also fertilized at one location, transported in an appropriate container to the stream, and placed in a separate incubator at the stream where they are hatched. After the fry reach the feeding stage, they are released into the stream.

This need for two separate pieces of equipment, one for transporting and another for incubating eggs and then growing out the fry hatched therefrom increases significantly the cost of raising fish to the fry or fingerling stage. Also, heretofore proposed fish egg transporting devices and incubators tend to have such disadvantages as complexity, high cost, low structural integrety and survival rates as well as the quality of the fry are often marginal.

Currently, transportation of fish fry is accomplished by placing the fry in water in a closed container. Air is left in the closed container to allow oxygenation of the fish during transportation. The fry are then transported to another location. The problem with this method is that the number of fish that may be transported per container is undesirably limited because the closed container can be filled to only one-third of its capacity with water.

SUMMARY OF THE INVENTION

I have now invented and disclosed herein certain novel devices which are designed to supplant the heretofore available and proposed fish egg incubators and transport containers for extended transport periods and reuse.

These novel devices are so designed that they can be employed to both: (1) transport eggs from one location to another, and (2) then incubate the eggs and grow out the fry at their remote location destination. This substantially reduces the cost of the equipment needed for these separate functions. Also, the cost of transferring the eggs from one piece of equipment to another is eliminated as is the damage that handling inevitably causes.

Generally, the novel transportation and incubation devices of the present invention comprise: (a) an insulated container; (b) a spacing structure in the insulated container; (c) egg containers stacked within the insulated container on the spacing structure; (d) ice trays within the insulated container on top of the egg trays; and (e) a water inlet which allows water to be introduced into the point below the lower-most egg tray and also allows the container to be drained.

Assembled as above-described, the transportation and incubation container of the present invention allows cool water formed by the melting of the ice trays to flow through the eggs. This cool water prevents excessive dehydration of the eggs and keeps the temperature of the eggs within an acceptable range.

During incubation, water is continually or intermittently introduced and circulated through the water inlet and out of the open top of the insulated container or drained back through the in take with a delay period before the incubator is filled with water again. When the eyed eggs hatch into alevin, they swim against the water flow to the bottom of the insulated container through specially designed perforations or holes in the bottoms of the egg trays.

The egg container may be a flat, open tray with a lid or cylindrical tube having both ends closed by caps.

An important feature of the closed-style egg containing tubes means is that it may be removed from the insulated, outer container and placed in a spawning stream to allow natural incubation of the eggs contained therein. In this situation, the egg containing tube is preferably made from biodegradable material.

In yet another embodiment, a water recirculating, filtering, cooling, and aerating system is housed in a sealed, airtight compartment within the insulated outer container means. Such an arrangement allows developing fry to be transported in much greater density than has heretofore been possible.

OBJECTS OF THE INVENTION

From the foregoing, it is clear that one primary and important object of the present invention is to provide a single device for both transporting and incubating eggs of aquatic creatures and then growing out the fry that develop therefrom.

Other important, but more specific, objects of the present invention are to provide a transportation, incubation, and grow-out container that:

is inexpensively manufactured from readily available components;

reduces the cost associated with incubating and rearing fry;

allows fish to be planted in spawning streams without the heretofore existing requirement of a separate incubation and grow-out facility at the headwaters of the spawning stream;

enables transportation of fry in much greater density then has heretofore been possible.

Other important objects and features and additional advantages of the invention will be apparent to the reader from the foregoing and the appended claims and as the ensuing detailed description and discussion proceeds in conjunction with the accompanying drawing.

DETAILED DESCRIPTION OF THE INVENTION

Figure 1:
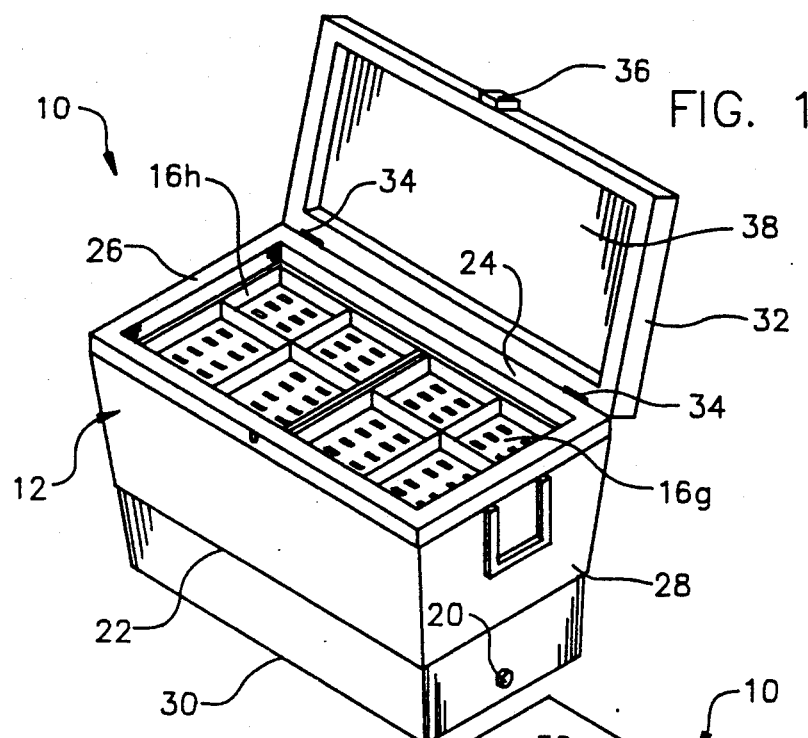
FIG. 1 is a perspective view of a first embodiment of the present invention with the cover open and the ice trays employed in that device removed.
Figure 2:
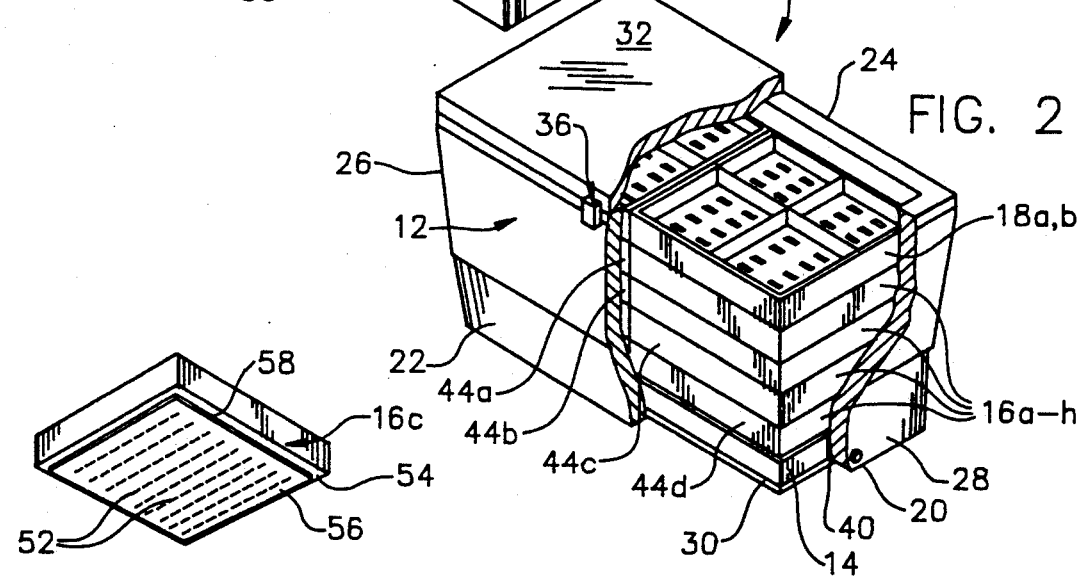
FIG. 2 is a perspective, cut-away view of the first embodiment of the present invention with the cover closed and latched.
Figure 3:
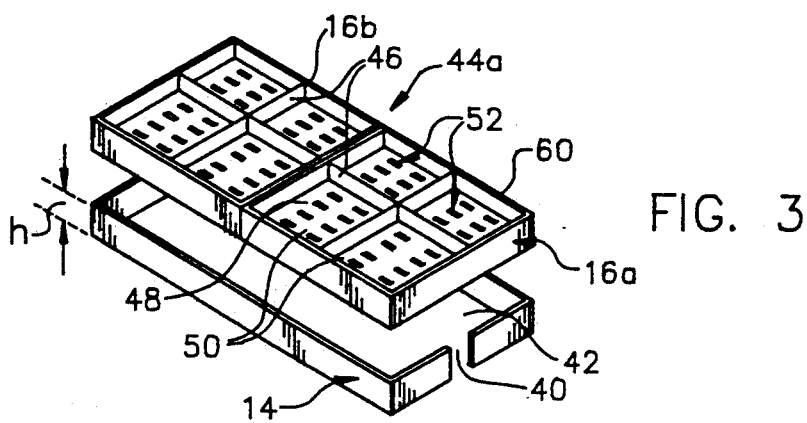
FIG. 3 is a perspective, exploded view of the spacing structure and egg containers means of the first embodiment.
Figure 4:
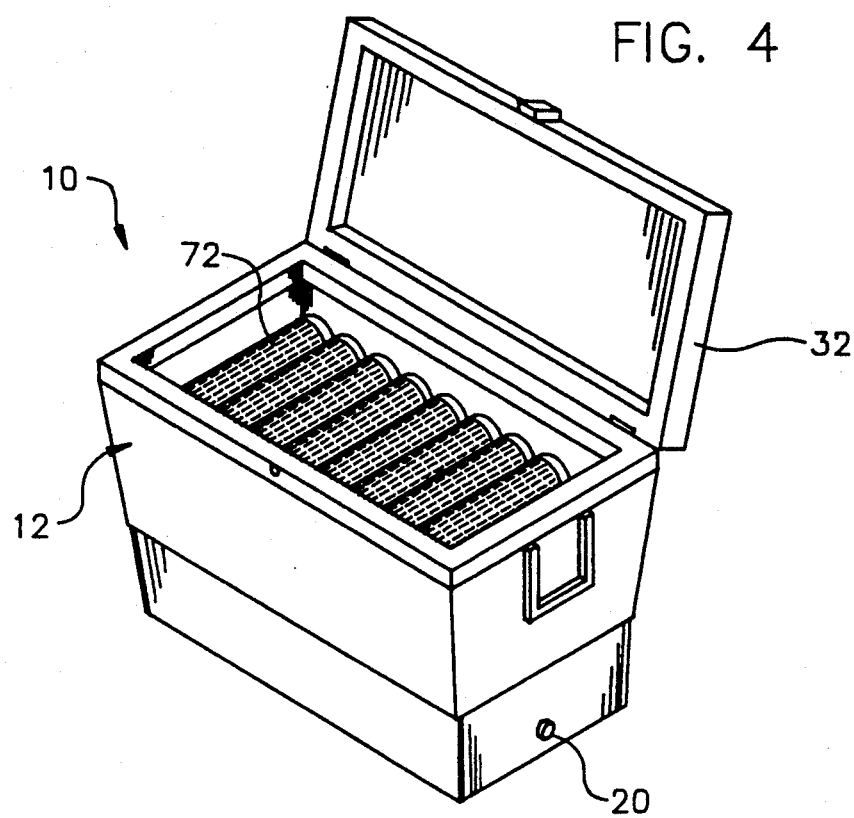
FIG. 4 is a perspective view of the second embodiment of the present invention with the cover open.
Figure 5:
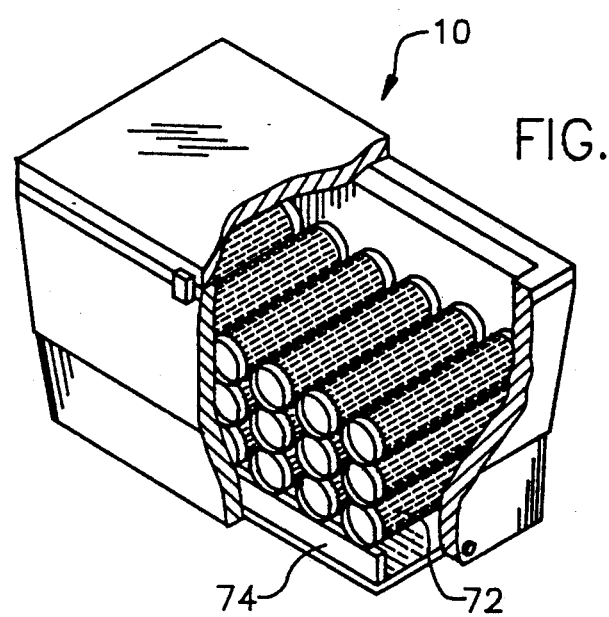
FIG. 5 is a perspective, cut away view of a second embodiment of the present invention with the cover closed and latched.
Figure 7:
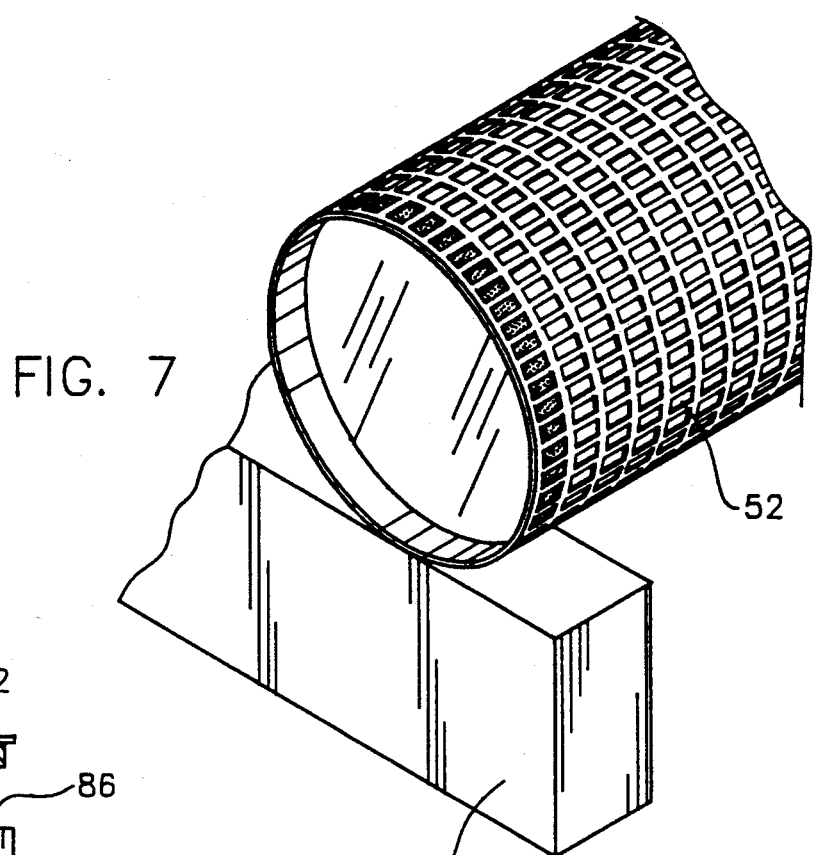
FIG. 7 is a perspective, detail view of the egg container and spacing structure of the second embodiment.

Referring now to the drawing, FIG. 1 depicts a transportation, incubation, and grow-out container 10 constructed in accord with the principles of the present invention. Container 10 comprises: (a) an insulated shell 12 (FIGS. 1 and 2); (b) spacer 14 (FIG. 3); (c) egg trays 16 (FIG. 3); (d) ice trays 18 (FIG. 2); and (e) water inlet 20 (FIGS. 1 and 4).

When container 10 is used for transportation, eyed eggs are stored in trays 16, and ice is held by the trays 18 above the egg trays 16. This allows cool water to flow over the eggs as the ice melts. The eggs are thus kept cool and moist. Water accumulates at the bottom of box 12, but does not drown the eggs because the egg trays are supported above the water by spacer 14.

During incubation, water is either continually or intermittently introduced into the container through the inlet 20 and allowed to flow out the top or drained through the inlet. When the eyed eggs hatch into sac fry, the sac fry swim to the bottom of the container 10 through perforations or holes in the egg containers 16.

A grow-out phase then begins. For this any ice trays and egg containers are typically removed. When the sac fry develop into starter fed or swim up fry, feed may be introduced into the insulated container 10 to allow the fry to develop even further. When the fry reach a maximum size determined by the volume of water in the insulated container 10, they may be introduced into a stream or into starting tanks.

Referring still to the drawing, the container shell or box 12 has a front side 22, a back side 24, a left side 26, a right side 28, and a bottom 30. The top of the box 12 is open, but may be selectively covered by a cover 32. The cover 32 is rotatably attached to the back wall 24 by hinges 34 (FIG. 1). A latch 36 is employed to lock the cover 32 in a closed position (shown in FIG. 2).

As mentioned above, the container shell or box 12 has an insulating layer sandwiched between inner and outer wall layers. The inner layer is preferably fabricated of a high density, food grade polyethylene or other polymer so that the container 10 can be readily disinfected and reused. A polyurethane or other efficient insulation is preferably employed so that the eggs in the insulated container can be kept cool without an unacceptably bulky container. The outer layer of the insulated container is fabricated of a high density polyethylene or other material which will input a high degree of structural integrity to the container. This makes the container capable of withstanding rough handling and allows it to be reused many times.

A raised portion 38 is formed on the inner surface of cover 32. This raised portion 38 is dimensioned to fit snugly within the opening in the top of box 12 when cover 32 is closed. The raised portion 38 allows cover 32 to contact box 12 over a greater surface area when closed to provide a superior insulating seal.

A handle is also provided on box 12 to facilitate the carrying thereof.

The sides 22, 24, 26, and 28 and bottom 30 of box 12 and cover 32 ar designed to keep the interior of box 12 cool when cover 32 is closed. To this end, the sides, bottom, and cover have thin interior and exterior walls with a layer of insulation therebetween. Accordingly, when cover 32 is closed and latched, box 12 substantially inhibits the flow of heat from the exterior to the interior thereof.

Water inlet 20 is placed on box 12 at the lower portion of right side 28. The height and configuration of spacer 14 (FIG. 3) determines the placement of the inlet 20. In general, the spacer 14 must support the lowermost egg tray 16a a fixed distance above the bottom 30 of box 12. The height of spacer 14, indicated by reference character "h" in FIG. 3, is the separation distance between egg tray 16a and container bottom 30.

As mentioned above, as the ice in trays 18 melts, water accumulates at the bottom of box 12. This height "h" of the spacer 14 should be sufficient to keep egg containing tray 16a above the water level after all of the ice is melted. Of course, the displacement of spacer 14 itself must be taken into account.

Once the height "h" of spacer 14 has been determined, the exact placement of inlet 20 can be determined. Specifically, the inlet 20 is preferably placed on any of the walls of box 12 such that water introduced through the inlet 20 enters the box 12 at a height less than the distance "h" from the bottom 30 of the box 12.

Spacer 14 has a generally rectangular configuration. When the spacer 14 is placed in the box 12, its outer faces are adjacent the insides of the walls of the box 12. Accordingly, a gap 40 is formed in the spacer 14; this gap coincides with the point at which the inlet 20 introduces water into the box 12. Water therefore flows unhindered into the interior 42 of the spacer 14 underneath the egg tray 16a.

Egg trays 16a–h are arranged in groups on levels 44a–d comprised of two trays 16 each (Hereinafter, when a specific tray 16 is being discussed with reference to the drawing, a letter suffix will be used as necessary to distinguish among the trays). When two egg trays 16 are arranged in a level 44, the overall shape of the level 44 is rectangular. This rectangular shape substantially conforms to the shape of the interior of the box 12.

Each tray 16 is a five-sided flat box having an open top. Dividers 46 within each tray 16 divide the interior space 48 thereof into four sections 50 of approximately equal size. Holes 52 are formed in the bottom side 54 of each box 16. These holes 52 allow water to pass vertically through the trays 16, but still allow the trays 16 to hold eggs. The dividers 46 substantially inhibit movement of eggs in the egg trays 16, thus may be omitted depending upon the circumstances of use.

Also, formed on the bottom side 54 of each tray 16 is a projecting surface 56. The discontinuity between this surface 56 and the remaining surface of bottom 54 creates a beveled corner 58 traversing the periphery of the bottom 54. This beveled corner is designed to engage the top edge 60 of a like configured tray 16. Accordingly, when one tray 16 is stacked upon another tray 16, the beveled corners 58 and edges 60 interact to prevent front and back and left and right movement of the trays 16 with respect to each other. The egg trays 16a–h thus form a stable column or matrix of trays when stacked on top of one another inside of box 12. Initially, the interior of the box 12 is cleaned and disinfected to prevent contamination of the eggs contained therein during transportation. The spacer 14, egg trays 16a–h, and ice trays 18a and b are similarly cleaned and disinfected. The spacer 14 is then placed on the bottom 30 of the box 12 with gap 40 adjacent inlet 20. The first layer 44a of egg trays 16 is then placed in box 12 on top of spacer 14. Eggs (not shown in FIG. 1–5) may then be placed in the egg trays 16a and b of the first level 44a. Alternatively, the eggs may be placed in the egg trays 16a and b before these egg trays are loaded into container 10.

A wicking material (not shown in FIGS. 1–5) may be placed between each layer 44 of egg trays 16. The wicking material 66 may be made of cheesecloth or a similar porous material. The function of the wicking material is to ensure that water will be dispersed evenly over the eggs contained in the egg trays 16 as it flows downwardly through the several layers 44 of trays 16. This process of stacking egg trays separated by wicking material may be repeated until all of the trays 16 are loaded arranged in layers 44a–d.

At this point, ice trays 18a and b are placed in the box 12 on top of egg trays 16a–h. Ice 68 is then put in the ice trays 18a and b, and the cover 32 of the box 12 is closed and locked by latch 36.

It should also be noted that a valve 70 is employed to close inlet 20 during transportation to prevent water 72 which accumulates at the bottom of box 12 from leaking out of the box 12 through inlet 20.

A second embodiment of the present invention is illustrated in FIGS. 4–8. Elements of the second embodiment that are the same as those in the first embodiment will be given the same reference characters and will not be discussed in further detail.

Figure 6A:
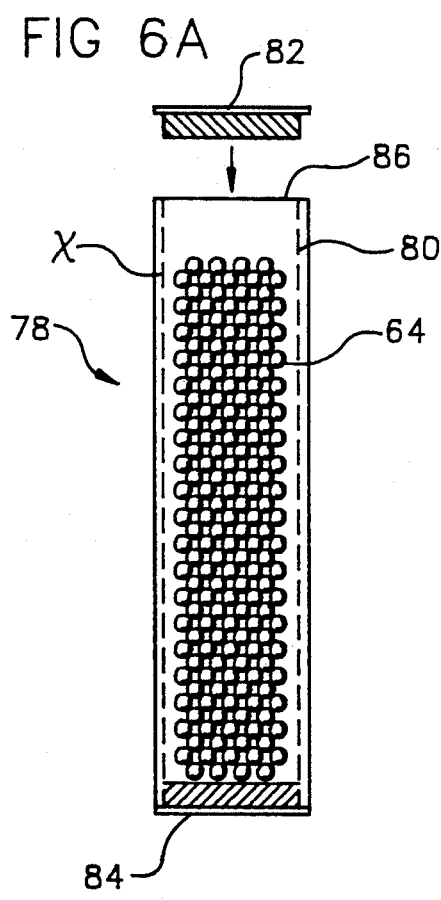
FIG. 6A is a side view of the egg container of the second embodiment with its cap removed.
Figure 6C:
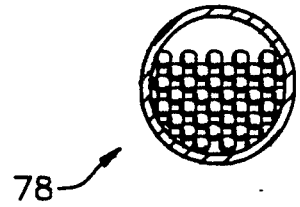
FIG. 6C is an end, cut away view of the egg container of the second embodiment taken along arrows 6C in FIG. 6B.
Figure 6B:
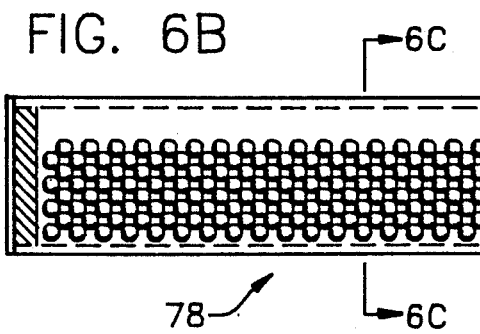
FIG. 6B is a side view of the egg container of the second embodiment in a horizontal position and with its end cap in place.

In this second embodiment, the eggs are loaded into egg tubes, 78 having perforations or holes 52 formed therein (FIGS. 4 and 6).

Also the second embodiment employs spacers 74 which run only along the inside surfaces of the front side 22 and back side 24 of the box 12. The spacers 74 function in basically the same manner as spacer 14.

In this embodiment of the invention, a thin open cell foam pad 76 placed on each row of egg tubes. Ice is spread over each pad 76. This ice is kept away from the eggs by of foam pad 76, but water can drip through the open cells of the foam pad 76. Foam pad 76 is thus very similar in function to the wicking material 66 of the first embodiment.

The egg tubes 78 have a hollow, cylindrical container 80 and caps 82 (FIG. 6). Cylindrical container 80 is sealed at both end 84 and end 86. Cap 82 allows the open end 86 to be closed to prevent the eggs 64 from flowing out that end when the egg tube 78 is horizontal.

In use, eggs are introduced into the tube with the tube in a vertical position (FIG. 6). Cap 56 is then installed.

A known, verifiable amount of eggs is contained within each egg tube 78. Accordingly, once the end cap 82 is sealed on the end 86 of the tube 80, a known quantity of eggs will be delivered.

The perforations or holes 52 in tubes 78 (and egg trays 18) are rectangular. The width of the holes is slightly smaller than the diameter of the eggs to be transported. Therefore, the eggs cannot pass through the holes, and the eggs are effectively held within the egg trays 18 and tubes 78. The diameter of the eggs vary according to the specific aquatic creature. The width of the holes 52 is thus determined by the specific egg type that is being transported.

Once hatched, the sac fry can swim through the holes 52. This is because the fry are curled in the egg. When the fry hatch, they uncurl and have a smaller cross-section-section than the eggs from which they hatch. The uncurled sac fry easily pass through the rectangular openings 52.

Figure 8A:
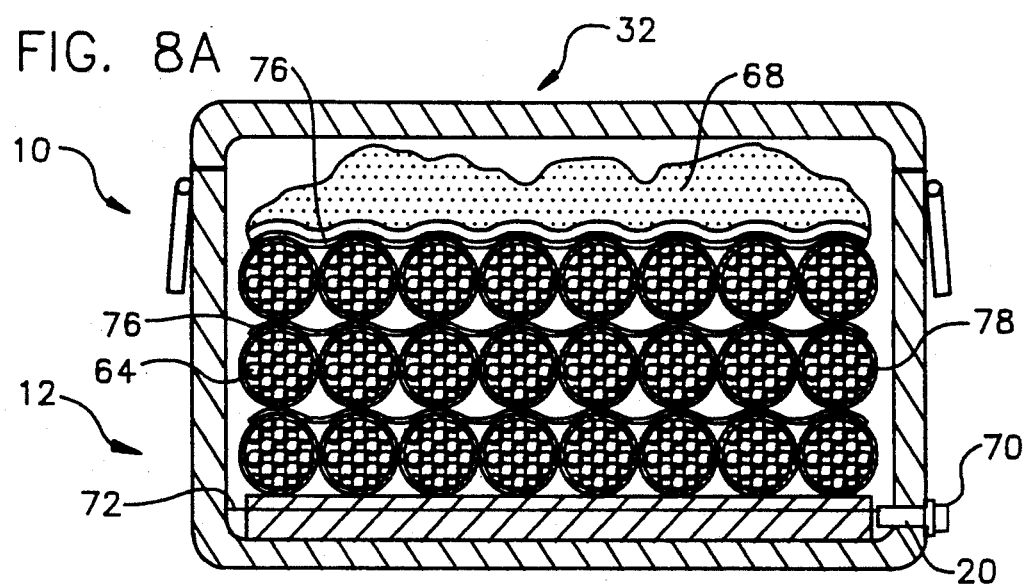
FIG. 8A is a side, schematic view of the second embodiment of the present as used in its transportation mode.

The egg tubes 78 may be made of a variety of materials, depending on the use to which the egg tubes 78 is put. In the normal transportation and incubation modes described above, the tubes may be made, for example, of plastic, cardboard, glass, metal or the like. In this situation, the egg tubes 78 are used in an almost identical fashion as the egg trays 16. One difference between the two embodiments is the exact procedure for stacking the egg tubes 78 within the box 12. More specifically, the egg tubes 78 will not interlock when stacked. However, as they are effectively sealed against the possibility of eggs escaping therefrom, the egg tubes 78 may be placed in the box 12 in any arrangement. FIG. 8 depicts the egg tubes being laid horizontally in evenly spaced rows and columns.

Another difference alluded to above, is that ice trays are generally not needed in the second embodiment of the invention. Instead, the ice is simply layered between the rows of containers and spread on the uppermost layer.

Wicking material as optionally provided in the first embodiment may be used with equal or greater effectiveness in the second embodiment. Since the egg tubes 78 do not have an open surface into which water may easily flow, the wicking material will insure that cold water dripping from the ice tray 18 flows into the perforations 52 formed through the egg tubes 78. Thus, water flows into the egg tubes 78 and does not simply flow around the sides thereof.

In certain situations, the egg tubes 78 may be made so that wicking material lines the surface of each hole 52. Such an arrangement of wicking material further improves the flow of water into and through the egg tubes 78.

The second embodiment is prepared for transportation as follows. Spacers 74 are placed in the box 12 along the inside of the front wall 22 and the back wall 24. Tubes 78 are stacked in the box 12 in three rows and eight columns (FIG. 9A). Foam pads 76 are placed between each row and on top of the uppermost row, and ice 68 is over each foam pad 76. Cover 32 is closed and latched shut with latch 36.

During transportation, the ice 68 slowly melts. As the cool water resulting from melting of ice 68 drips through the open cells of foam pad 74, it drips on the eggs in egg tubes 72, continues flowing through the holes 52 in tubes 72, and continues through all of the tubes in box 12. As the water drips from one egg tube to the next, it is wicked into the holes by wicking material 76 to ensure that eggs within the tubes are moistened and cooled.

The eggs are thus kept at an acceptably low temperature, preferably between 35° and 45° Fahrenheit, during transporting. Further, the water passing over the eggs 64 prevents the eggs 64 from becoming overly dehydrated during transportation. The insulating properties of the box 12 and the cover 32 ensure that the ice 68 will not melt too quickly.

The temperature within the box 12 may be controlled even further by controlling the ambient temperature around the transportation and incubation container 10. For example, the container 10 may be transported in a refrigeration equipped truck or container and stored in a refrigerated warehouse.

Depending on the length of time that the eggs are transported, dehydration of the eggs of around 15% by weight can be expected. Therefore, when the container 10 reaches the hatchery, the eggs first need to be rehydrated to restore water lost during transportation and "equilibrated" to the water temperature of the hatchery. Gradually equilibrating the temperature of the eggs to the hatchery water temperature increases the likelihood that the eggs will survive transportation.

Both equilibration and rehydration may easily be accomplished with the present invention as follows. A hose is hooked up to the valve 70 of container 10, and water of approximately the same temperature as that of the eggs 64 in the container is introduced into the container through the inlet 20 until the water flows out the top of the container 10. The temperature of this flowing water is gradually (e.g., over the course of about one hour) increased until it is substantially the same as that of the water at the hatchery. The temperature of the eggs within the box is thus equilibrated to the temperature of the water at the hatchery.

At this point, the rehydrated eggs are typically disinfected. To this end, an iodine solution can be introduced through inlet 20 or poured over the eggs through the opening in the top of box 12. It is important that the eggs be rehydrated prior to sanitization because the iodine solution can kill the fish inside of a dehydrated egg.

Figure 8B:
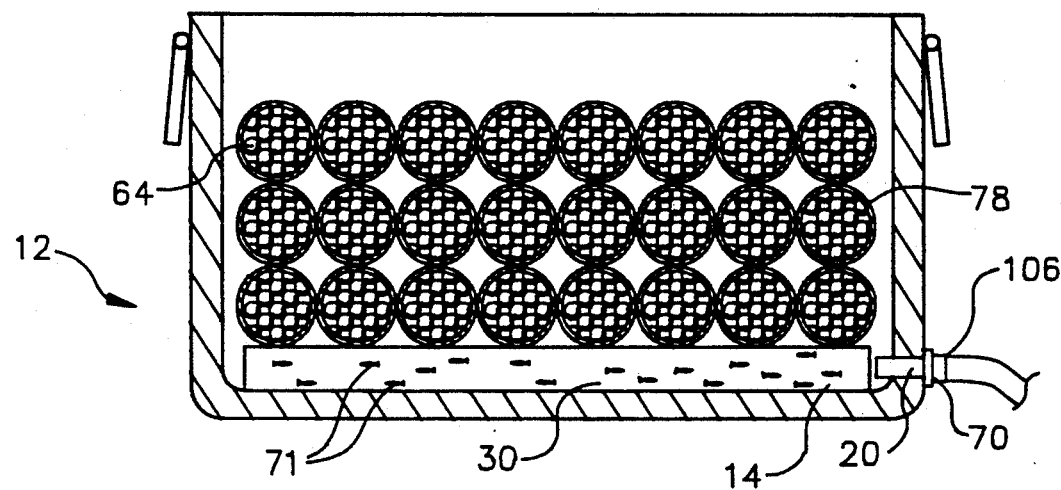
FIG. 8B is a side, schematic view of the second embodiment as used in its incubation mode.

After the eggs have been equilibrated, rehydrated, and sanitized, the container 10 can be used in its incubation mode to hatch the eyed eggs into sac fry 71 (FIG. 8B). The hatching process is well-known and will not be described in detail herein. As the sac fry 71 hatch from the eyed eggs, they swim toward the bottom 30 of the box 12.

After all of the eggs are hatched into sac fry, the box 12 is used in its grow-out mode to rear the developing fry. During the grow-out mode, any egg containers and ice trays are removed from the box 12. While water is introduced into box 12 through inlet 20 and circulated through the box and discharged out of the top of box 12 to keep feces, uneaten food, and other unwanted debris from accumulating in the box, to keep a liberal supply of oxygen in the water in which the fry are reared, and to control the temperature of that environment.

Figure 8C:
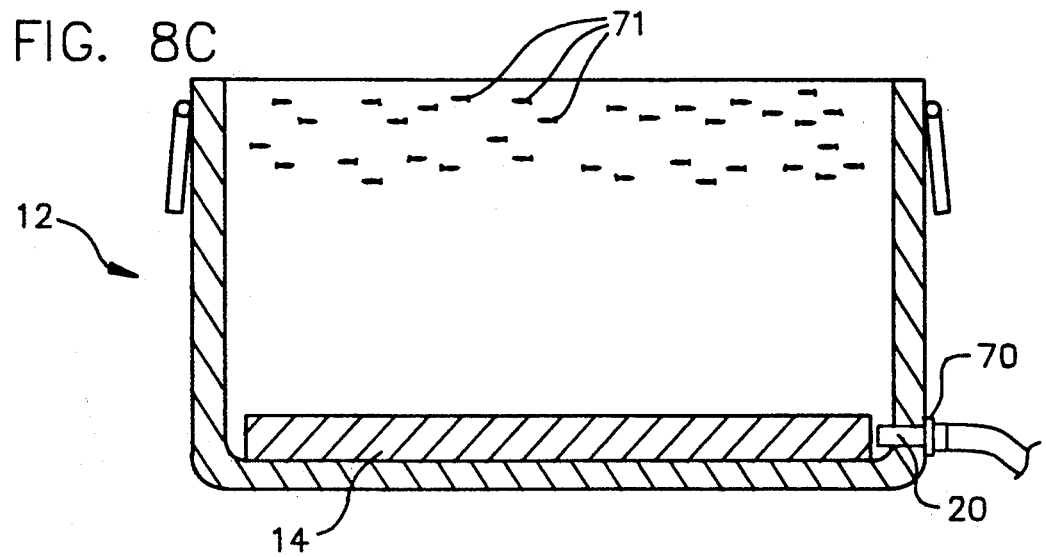
FIG. 8C is a side, schematic view of the second embodiment as used in its grow-out mode.

As the sac fry deplete the nutrients in the yolk sac, the resulting starter fed fry begin to swim to the surface of the water (FIG. 8C). Feed may be introduced into the container to allow continued rearing of the fry in the box 12. Again, water is continually flushed through inlet 20 into the box 12 and out of the top thereof. The fry may be grown out in this manner until their size requires that they be moved into a pen, tank, or stream.

Another important use of the egg tubes 78 described herein is as in-stream incubators for planting fish in spawning streams. Rather than incubating in container 10, the egg tubes 78 are removed from the container and placed in a stream. The egg tubes 78 are then secured in the stream by burying then in loose gravel, staking then to the stream bed, etc. The flow of water through the holes in the egg tubes 78 is sufficient to incubate the eggs and bring them to the point where they hatch. Once hatched, sac fry exit the egg tube through slots 52. This embodiment of the invention has the advantage that it eliminates the need for grow-out pens currently maintained at the headwaters of the spawning stream.

When the egg tubes 78 are to be planted in a spawning stream as just described, it is preferable that they be made out of biodegradable materials. Therefore, after the fish hatch from the egg, the egg tubes 78 disintegrate without further interference or effort by man.

To protect the eggs while they are incubating in the stream, the egg tubes 78 may be impregnated with a fungicide such as Vinyzene. The fungicide prevents the growth of fungus which would otherwise kill or damage the fish. Preferably, the fungicide is employed as part of the egg tube material or pellets or in a form that allows it to be slowly released to the eggs throughout the entire incubation period.

In this manner, the egg tubes 78 of the present invention decrease the costs and increase the survivability of fish planted at the headwaters of a spawning stream.

Figure 9:
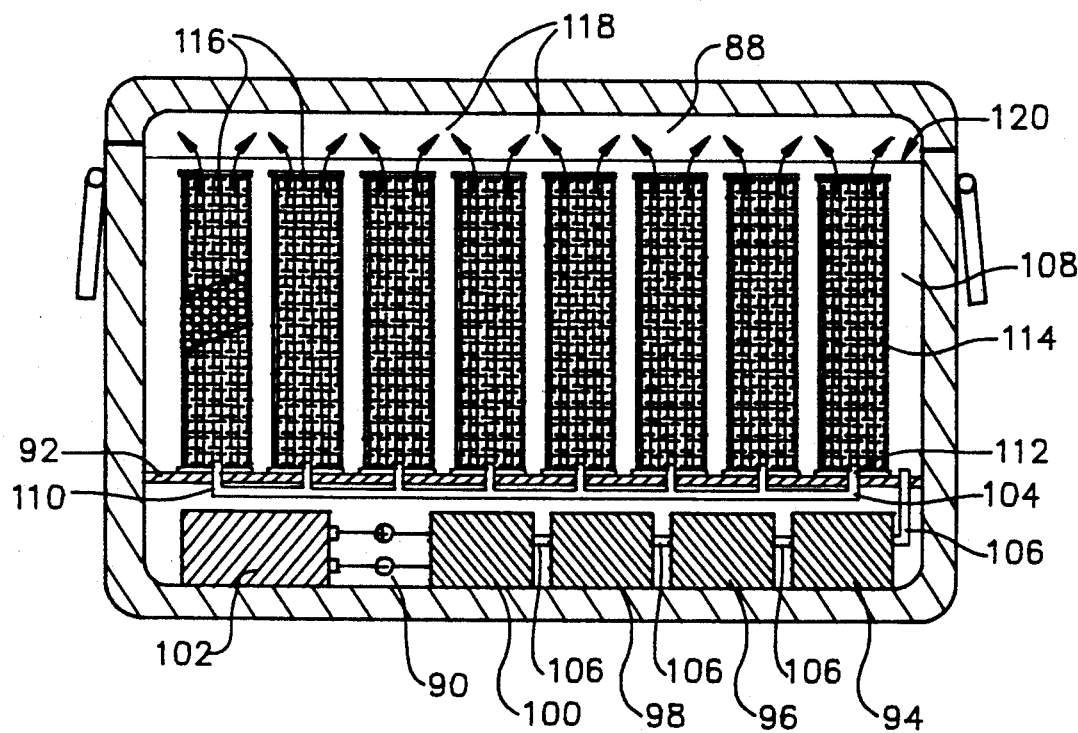
FIG. 9 is a side, schematic view of a third embodiment of the present invention.

A third embodiment of the present invention is shown in FIG. 9. Elements of the third embodiment that are the same as those of the first embodiment will be given the same reference characters and will not be discussed in further detail.

Like the first embodiment of the invention, the third embodiment has an insulated shell or box 12. The interior of box 12 is divided into a water compartment 88 and a dry compartment 90 by a divider 92. The divider 92 provides an airtight, water-tight seal between compartment 88 and compartment 90.

The dry compartment 90 contains a pump 94, a filter 96, a cooler 98, an aerator 100, a battery 102, an output manifold 104, and input tubing 106. Water 108 in water compartment 88 flows through input tubing 106 to pump 94. The pump 94 pumps the water through the filter 96 to remove bacteria and other impurities from the water. The water then passes into the cooler 98 where the water is cooled so that its temperature is within the range of temperatures suitable for the type of fry being transported. The water is next aerated or oxygenated by aeration unit 102, after which the water flows into output piping 104.

Manifold 104 has outlet ports 110. The output ports 110 protrude through divider 92.

Each outlet port 110 terminates in a fixture 112 to which a fry-containing tube 114 is attached. The fixtures 112 allow water to flow from the outlet ports 110 of manifold 104 into the fry-containing tubes 114. As in the other embodiments of the invention, the fry-containing tubes 114 are perforated. The water is circulated from the fixtures 112 through the fry tubes 114, and out the tops 116 of those tubes as shown by arrows 118. Water consequently rises in the water compartment 88 to the level indicated by reference character 120. The fry in the perforated tubes are thus submerged in water during transport. Water discharged from tubes 114 flows into input tubing 106 and is recirculated.

The battery 102 is electrically connected to, and supplies motive force for, pump 94, cooler 98, and aeration unit 100, which is vented to the outside of the container shell 12.

Alternatively, one can employ compressed air or oxygen for aeration. The aeration unit 100 may comprise a compressed air tank with a valve that will allow the air to be introduced into the water flowing through the input tubing 106 at an appropriate rate.

The battery 102 may be of the rechargeable type, and a plug may be provided on the exterior of the box 12. This allows the battery to be recharged. Also, the battery can be conserved by operating the transporter/incubator on external power when such power is available.

The invention may be embodied in still other forms without departing from the spirit or essential characteristics of the present invention. The specifically disclosed embodiments are therefore to be considered in all respects as illustrative and not restrictive, the scope of the invention being indicated by the appended claims rather than by the foregoing description and the drawings. All changes which come within the meaning and the range of equivalency of the claims are therefore intended to be embraced therein.

I claim:

1. Apparatus for transporting and incubating eggs of aquatic creatures comprising:
   an insulated container having side and bottom walls and a lid;
   egg containing means in the insulated container for containing the eggs;
   spacer means in the container for supporting the egg containing means above the bottom of the insulated container;
   ice retaining means in said insulated container means for containing ice; and
   an inlet means in the lower reaches of the insulated container via which water can be introduced and discharged into said container; whereby
   the apparatus is used in a transportation mode in which ice is placed in the ice retaining means, the lid is closed, and inlet means is closed; and
   the apparatus is also used in an incubation mode in which the lid is opened and water is introduced into the insulated container through the inlet means.

2. Apparatus as defined in claim 1 in which the egg containing means has perforations which keep the eggs within the egg containing means but allow alevin that hatch from the eggs to escape from the egg-containing means.

3. Apparatus of claim 1 in which the egg containing means comprises a stack of egg trays having perforations formed in the bottoms thereof.

4. Apparatus as defined in claim 1, in which the egg-containing means is comprised of cylindrical containers having both ends capped for closing the ends.

5. Apparatus as defined in claim 4 in which the containers are made of biodegradable material.

6. Apparatus as defined in claim 4 in which the containers are impregnated with a fungicide.

7. Apparatus as defined in claim 1 which has wicking means arranged above each egg containing means for ensuring that water is dispersed evenly over the eggs contained in the egg containing means as the water flows downwardly and thereby keeps said eggs cool and hydrated.

8. A method of transporting and incubating eggs of aquatic creatures, comprising the steps of:

placing the eggs in a slotted, cylindrical, biodegradable container, so placing the slotted biodegradable container within a closed insulated container that water from the melting ice flows through the biodegradable container, thereby cooling and hydrating the eggs, removing the biodegradable container at a destination, position the biodegradable container in a freshwater stream, hatching the eggs into alevin in the container, and allowing the alevin to swim out of the biodegradable container through the slots therein.

9. A device for containing the eggs of aquatic creatures during transportation, comprising: a cylindrical, biodegradable container having slots formed therein, said slots being small enough to keep the eggs from flowing out of the container but large enough that they allow hatched aquatic creatures to swim out of the container.

10. A method of transporting and incubating eggs of aquatic creatures, comprising the steps of:

providing a slotted, biodegradable container adapted to contain the eggs;

placing the eggs in the container;

transporting the container and eggs in a cool, moist environment to a freshwater stream;

so positioning the container in the stream that water from the stream flows through the container;

incubating the eggs until they hatch into alevin; and allowing the alevin to swim out of the container through the slots therein.

11. A method of transporting and incubating the eggs of aquatic creatures, comprising the steps of:

placing the eggs in one or more perforated, egg containing means;

placing the egg containing means on top a support housed in an insulated container;

storing ice in the insulated container;

sealing the insulated container;

transporting the insulated container;

opening the insulated container at its destination; and thereafter introducing water into the insulated container to rehydrate said eggs.

12. A method as defined in claim 11 further comprising the step of disinfecting the eggs after they have been rehydrated.

13. A method as defined claim 11, in which, in rehydrating the eggs, the temperature of the water circulated through the insulated container is gradually altered until the temperature in the container is stabilized at the temperature of a water supply at the destination.

* * * * *